United States Patent [19]
Weidman

[11] Patent Number: 5,075,871
[45] Date of Patent: Dec. 24, 1991

[54] VARIABLE GAIN NEURAL NETWORK IMAGE PROCESSING SYSTEM

[75] Inventor: William E. Weidman, Arlington, Tex.

[73] Assignee: Recognition Equipment Incorporated, Irving, Tex.

[21] Appl. No.: 453,588

[22] Filed: Dec. 20, 1989

Related U.S. Application Data

[63] Continuation-in-part of Ser. No. 296,520, Jan. 12, 1989, Pat. No. 4,941,122.

[51] Int. Cl.$^5$ .............................................. G06F 15/18
[52] U.S. Cl. ...................................... 395/24; 382/15; 395/11
[58] Field of Search ........................... 364/513; 382/15

[56] References Cited
U.S. PATENT DOCUMENTS 4,941,122  7/1990  Weideman ........................ 364/513

OTHER PUBLICATIONS

A Neural Network for Visual Pattern Recognition, IEEE Computer, K. Fukushima, Mar. 1988, pp. 65-75.

Primary Examiner—Allen R. MacDonald
Attorney, Agent, or Firm—Ross, Howison, Clapp & Korn

[57] ABSTRACT

A neural-simulating system for an image processing system includes a plurality of networks arranged in a plurality of layers, the output signals of ones of the layers provide input signals to the others of the layers. Each of the plurality of layers include a plurality of neurons operating in parallel on the input signals to the layers. The plurality of neurons within a layer are arrange in groups. Each of the neurons within a group operate in parallel on the input signals. Each neuron within a group of neuron operates to extract a specific feature of an area of the image being processed. Each of the neutrons derives output signals from the input signals representing the relative weight of the input signal and a gain weight associated with each of the neurons applied thereto based upon a continuously differential transfer function for each function.

7 Claims, 2 Drawing Sheets

VARIABLE GAIN NEURAL NETWORK IMAGE PROCESSING SYSTEM

This application is a continuation-in-part of U.S. patent application, Ser. No. 07/296,520, filed Jan. 12, 1989, and entitled "Neural Network Image Processing System" now U.S. Pat. No. 4,941,122.

TECHNICAL FIELD

The present invention relates to image processing systems, and more particularly to a system and network for pattern recognition by simulated neural processes.

BACKGROUND OF THE INVENTION

The biological nervous system is a highly efficient and powerful organ for the processing of information. A feature of the biological nervous system is its capability of responding to a wide range of stimuli with an analog, rather than a binary, response. The biological nervous system is also capable of adapting to different conditions and may also be taught to learn to adapt to variable conditions.

Although biological prototypes may not be duplicated exactly by utilizing artificial neural systems and networks, it is desirable to provide neural systems and networks having similar characteristics, for example, an analog response which varies over a range of stimulus. It is also desirable to simulate with neural systems and networks, the adaptability of the biological nervous system to perform many different logic functions. An artificial neural system is defined as a dynamical system that can carry out useful information processing by utilizing state response to initial or continuous input. The most common structures in artificial neural systems are networks of processing elements or "neurons" that are interconnected via information channels. Each neuron can have multiple input signals, but generates only one output signal. The inputs to a neuron are generally copies of output signals from other neurons as well as inputs from outside the network. The behavior of neurons, the relationship between their inputs and outputs, are generally governed by first-order ordinary differential equations in the output signal variable.

By providing some or all of the neurons in a network with the capability to self-adjust, some of the coefficients in their governing differential equations, the network can be rendered adaptive. The idea of a self-adapting dynamical system that can modify its response to external force in response to experience is one of the central concepts of an artificial neural system. Such systems therefore have the processing capabilities for real-time high-performance pattern recognition. Different patterns may be recognized by adapting a neural logic system to perform different logic functions and thereby respond to significant features which characterize a certain pattern. As used herein, patterns may represent, for example, alphanumeric symbols; objects within a scene, such as military targets; blood cells; defects in manufactured items; speech patterns; spatial representations of lines; and the like.

Many previously developed pattern recognition systems utilize linear discriminant functions on a set of features of the input pattern which limits the performance of such systems. Neural network systems, on the other hand, are non-linear and as such, have the potential to provide better solutions. Such networks also adapt, or learn, the solution in an iterative manner and have the advantage of discovering features necessary for recognizing patterns in image data. Previously developed neural network systems, however, suffer from their slow ability to learn. A need has thus developed for a neural network system that can learn arbitrary associations and recognize patterns quickly.

SUMMARY OF THE INVENTION

In accordance with the present invention, a neural-simulating system for an image processing system is provided. The neural-simulating system includes a plurality of layers. Each of the plurality of layers include a plurality of neurons operating in parallel on the layer input signals applied to the plurality of layers. The plurality of neurons within a layer are arranged in groups with each group of neurons extracting a different feature. Each of the neurons within a group operate in parallel on the input signals. Each neuron within a group of neurons performs the same functions and operates to extract the group feature from an area of the image being processed. Each of the neurons derives output signals from a continuously differential transfer function for each of the neurons based upon a product of a gain weight and a combination of sets of weights associated within the neurons and the layer input signals.

In accordance with another aspect of the present invention, a neural-simulating system for an image processing system includes an adaptive network associated with a plurality of neurons for generating correction signals based upon the input and output signals of each neuron and the desired output signals of the system. The average of the correction signals are used to modify the weights for each neuron within a group of neurons.

In accordance with another aspect of the present inventions, a clustering technique is utilized to reduce the network training set to a representative sample that the network trains upon and for updating the training set of patterns input to the network.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1A:
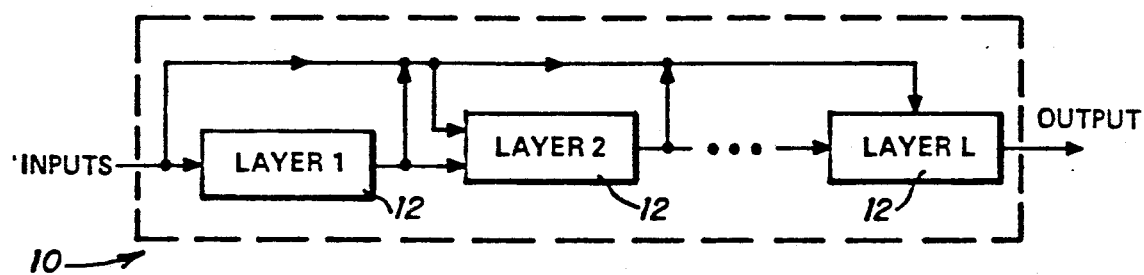
FIG. 1a, FIG. 1b and FIG. 1c are block diagrams illustrating the present neural network system, a layer within the system and a neuron within a layer, respectively.
Figure 1B:
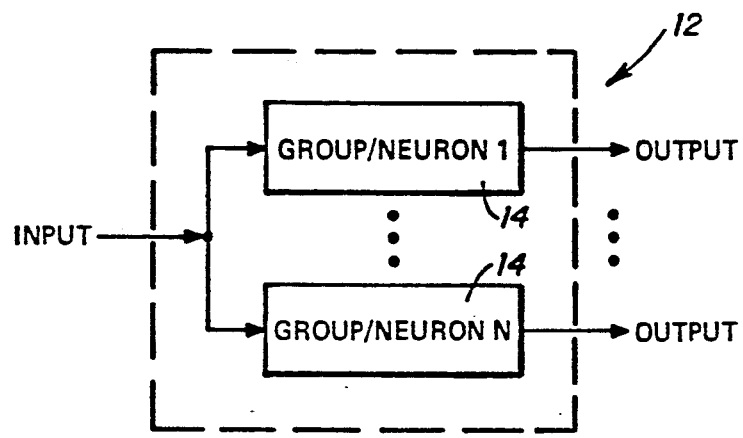

Referring to FIG. 1, the present neural network is illustrated, and is generally referred to by the numeral 10. Neural network 10 includes a plurality of layers 12. The present neural network 10 is capable of operating in a one-dimensional or two-dimensional embodiment. For image processing, neural network 10 operates in a two-dimensional embodiment. For a one-dimensional embodiment, each layer 12 includes a plurality of neurons 14 (FIG. 1b). In a two-dimensional embodiment, each layer 12 includes a plurality of groups of neurons 14. Each group of neurons includes a plurality of neurons. Each neuron within a layer in a one-dimensional embodiment and each group of neurons within a layer in the two-dimensional embodiment operate on the same input signal or stimulus in a parallel fashion. The neurons output a non-linear function of the combination of the inputs. The neurons in each group 14 of neurons in a layer are feature detectors that analyze an image for the same feature in different locations of the image. Each group 14 detects a different feature.

Figure 1C:
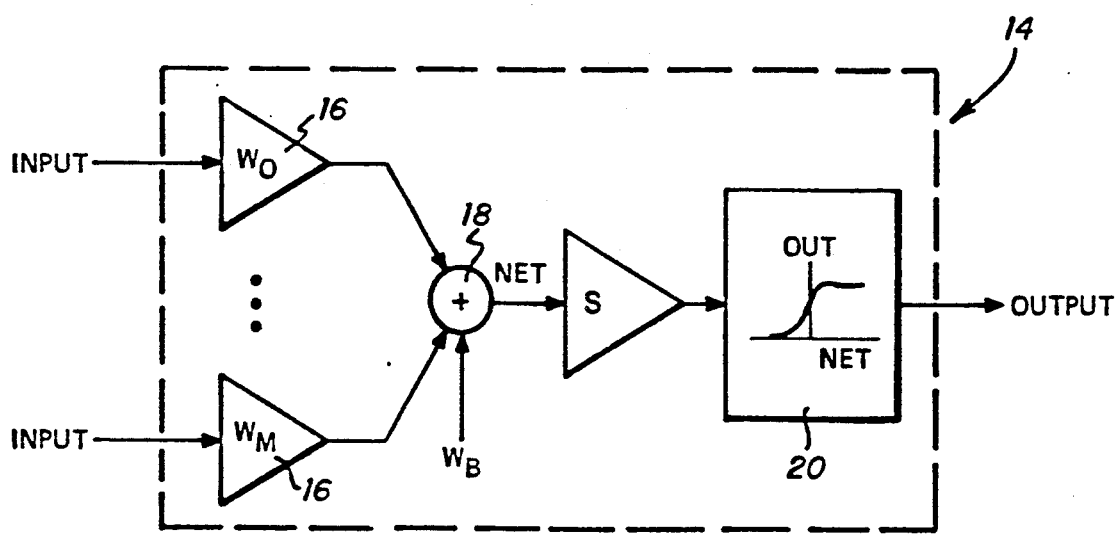

Referring to FIG. 1c, the capability of neural network 10 is imbedded in the organization of the neurons, the groups, and in the weights that each group uses to produce the combination of its inputs. The learning algorithm of the present invention is used to determine the required weights to solve the problem. Input signals are multiplied by a plurality of weight factors 16 which are then summed by a summing network 18. The output of summing network 18 is multiplied by a variable gain factor, S. The input signals are then output through an activity function 20 to generate the output of the neuron. Activity function 20 provides for a continuously differential transfer function. A neuron output is in turn applied to each subsequent layer 12 as an input to the neurons comprising each layer 12. The use of the variable gain that is trained for each neuron within a group 14 of neurons allows for improved learning speed.

The function of each neuron is dependent upon the input applied to each neuron weight and the weights are different for each neuron. The weights, for example, for neuron 1 in group 1 of layer 12 maybe such to render that neuron sensitive to lines in a horizontal direction of an image. The next neuron that is in parallel, and in group 2 of layer 12 may be sensitive to lines of a vertical direction. Therefore, a layer may have many groups of neurons which are being processed in parallel. Each group of neurons has a different response to the same stimulus, which is the image or other input to network 10 and the outputs of groups in previous layers. In the image processing system of neural network 10, neurons within a group have the same function, but different neurons within the group process different portions of the stimulus. The function of each neuron 14 and the weights applied to each neuron in a group are the same; however, the inputs to the neuron are different depending upon the area of the stimulus or image being processed. Neural network 10 presents a model for implementing the columnar organization found in the visual cortex of the brain.

Neural network 10 implements equations 1-10 described below for a one-dimensional embodiment of the present invention, and equations 11-22 for the two-dimensional image processing of the present invention.

$$o_j(p) = f(s_j(k)net_j(p)) \tag{1}$$

$$net_j(p) = \Sigma_i w_{ij}(k)o_i(p) + w_j(k) \tag{2}$$

$$w_{ij}(k+1) = w_{ij}(k) - u(k)g_{ij}(k) \tag{3}$$

$$s_j(k+1) = s_j(k) - u(k)g_{sj}(k) \tag{3a}$$

$$g_{ij}(k) = \Sigma_p e_j(p)o_i(p) + cg_{ij}(k-1) \tag{4}$$

$$g_{sj}(k) = (\Sigma_p e_j(p)net_j(p))/s_j(k) + cg_{sj}(k-1) \tag{4a}$$

where:

$o_j(p)$ is the output of the jth neuron for the pth pattern;

$s_j(k)$ is the gain weight of the jth neuron;

$f(s_j(k)net_j(p))$ is the non-linear function for the jth neuron which is typically $1/(1+\exp(-s_j(k)net_j(p)))$ but may be a different function as long as the function is continuously differentiable;

$s_j(k)net_j(p)$ is the product of the linear combination of the inputs $o_i(p)$ for the pth pattern with the weights $w_{ij}(k)$ that connect the ith neuron to the jth neuron for kth iteration or weight change and the gain weight $s_j(k)$;

$w_j(k)$ is a bias term for the jth neuron which is updated as $w_{ij}(k)$ except that $o_i(p)=1$ in Equation 4;

$u(k)$ is the adaptation step;

$g_{ij}(k)$ is the estimate of the gradient of the error criterion with respect to the $w_{ij}(k)$ weight at the kth iteration;

$g_{sj}(k)$ is the estimate of the gradient of the error criterion with respect to the $s_j(k)$ gain weight of the kth iteration;.

c is forgetting constant that controls the estimate of the gradient; and $e_j(p)$ is the error of the jth neuron for the pth iteration.

Network 10 is presented with a set of P patterns, after which the weight factors 16 are updated. The process is then repeated until the network achieves the desired performance. The error $e_j(p)$, is computed by:

$$e_j(p) = (o_j(p) - d_j(p))f'(s_j(k)net_j(p))s_j(k) \text{ if j is an output neuron;} \tag{5}$$

or $$e_j(p) = \Sigma_m e_m(p)w_{jm}(k)f'(s_j(k)net_j(p))s_j(k), \text{ otherwise.} \tag{6}$$

where:

$d_j(p)$ is the desired output of the jth neuron for the pth pattern and the summation is over the neurons that use the output of the jth neuron as its input, and the subscript m denotes that these terms are from later layers.

The adaptation step or convergence factor, u(k) is determined by:

$$u(k) = u \text{ if user chooses constant convergence factor} \tag{7a}$$

$$= \text{Min}(F^*MSE)/(\Sigma_i \Sigma_j g_{ij}^2(k)), \text{LIMIT}) \text{ if user chooses proportional decay variable convergence factor; or} \tag{7b}$$

$$= \text{Min}(F/\Sigma_i \Sigma_j g_{ij}^2(k), \text{LIMIT}) \text{ if user chooses constant decay variable convergence factor.} \tag{7c}$$

where u, F, and LIMIT are constants selected by the user and MSE is the estimate of the mean squared error:

$$MSE = (1/p)\tfrac{1}{2}\Sigma_p \Sigma_j (d_j(p) - o_j(p))^2 \tag{8}$$

where $o_j(p)$ is an output neuron.

Another variation of the present invention, which is known as the group variable convergence factor method, replaces Equations 5 and 6 with 9 and 10.

$$e_j(p) = (o_j(p) - d_j(p))s_j(k) \text{ if j is an output neuron, or} \tag{9}$$

$$e_j(p) = \Sigma_m e_m(p) f'_m(s_m(k)net_m(p)) \; w_{jm}(k)s_j(k), \quad \text{otherwise;} \tag{10}$$

which is different only in the fact that the $f'_j(s_j(k)net_j(p))$ term is omitted.

The present neural network implements equations 11-22 for a two-dimensional array of neurons for image processing.

$$o_j(n,m,p) = f_j(s_j(k)net_j(n,m,p)) \tag{11}$$

$$net_j(n,m,p) = \Sigma_i \Sigma_r \Sigma_s w_{ij}(r,s,k)o_i(n+r,m+s,p) + w_j(k) \tag{12}$$

$$w_{ij}(x,y,k+1) = w_{ij}(x,y,k) - u(k)g_{ij}(x,y,k) \tag{13}$$

$$s_j(k+1) = s_j(k) - u(k)g_{sj}(k) \tag{13a}$$

where:

$o_j(n,m,p)$ is the output of the neuron at location (n,m) in the jth group for the pth pattern;

$s_j(k)$ is the gain weight;

$f_j(s_j(k)net_j(n,m,p)$ is the nonlinear function for the jth group which is typically $1/(1+\exp(-s_j(k)net_j(n,m,p))$, but may be a different function as long as it is differentiable;

$s_j(k)net_j(n,m,p)$ is the product of the linear combination of the inputs, $o_i(n,m,p)$ for the pth pattern with the weights, or filter $w_{ij}(x,y,k)$, that connect the ith group to the jth group for kth iteration or weight change and the gain weight $s_j(k)$;

$w_j(k)$ is a bias term for all the neurons in the jth group;

$u(k)$ is the adaptation step and;

$g_{ij}(x,y,k)$ is the estimate of the gradient of the mean squared error with respect to the $w_{ij}(x,y,k)$ weight at the kth iteration.

The adaptation step or convergence factor, u(k) is determined by Equation 7.

The estimate of the gradient is computed by:

$$g_{ij}(k) = \Sigma_p e_j(n',m',p)o_i(m'+x,m'+y,p) + cg_{ij}(k-1) \tag{14}$$

$$g_{sj}(k) = \Sigma_p e_j(n',m',p)net_j(n',m',p)/s_j(k) + cg_{sj}(k-1) \tag{14a}$$

if the representative neuron method is used, or $$g_{ij}(k) = \Sigma_p \Sigma_m \Sigma_n e_j(n,m,p) \; o_i(n+x,m+x,p) + cg_{ij}(k-1) \tag{15}$$

$$g_{sj}(k) = \Sigma_p \Sigma_m \Sigma_n e_j(n,m,p)net_j(n,m,p)/s_j(k) + cg_{sj}(k-1) \tag{15a}$$

if the average group gradient method is used, with c being the forgetting constant that controls the estimate of the gradient and $e_j(n,m,p)$ being the error of the neuron at the location (n,m) in the jth group for the pth pattern.

If the representative neuron method is used, the representative neuron found at location (n',m') is found by one of the following:

(n'm') is chosen to be the coordinates of $$\text{Max} \, o_j(n,m,p) \tag{16}$$
$$\scriptsize n,m$$

$$\text{Max} \, e_j(n,m,p) \tag{17}$$
$$\scriptsize n,m$$

$$\text{Min} \, e_j(n,m,p) \tag{18}$$
$$\scriptsize n,m$$

The error, $e_j(n,m,p)$ is determined by:

$$e_j(n,m,p) = \Sigma_p(o_j(n,m,p)/(\underset{n,m}{\text{Max}} \; o_j(n,m,p))) \; ((\underset{n,m}{\text{Max}} \; o_j(n,m,p)) - \tag{19}$$

$$d_j(p)) \cdot f'_j(s_j(k)net_j(n,m,p))s_j(k)$$

if the jth group is an output group; or $$e_j(n,m,p) = \Sigma_p \Sigma_y \Sigma_r \Sigma_s w_{jj}(r,s,k)e_y(n-r,m-s,p) \tag{20}$$

$$f'_j(s_j(k)net_j(n,m,p))s_j(k)$$

if the jth group is not an output group and the summation is over the neurons and groups that use the output, $o_j(n,m,p)$, as its input, with $d_j(p)$ as the desired output of the jth groups for the pth pattern, and the subscript y denotes that these terms are from subsequent layers.

Another variation which is preferred and known as the group variable convergence factor method omits the $f'j(net_j(n,m,p))$ from Equations 19 and 20 and is $$e_j(n,m,p) = \Sigma_p(o_j(n,m,p)/(\underset{n,m}{\text{Max}} \; o_j(n,m,p))) \; ((\underset{n,m}{\text{Max}} \; o_j(n,m,p)) - \tag{21}$$

$$d_j(p))s_j(k)$$

if the jth group is an output group $$e_j(n,m,p) = \Sigma_p \Sigma_y \Sigma_r \Sigma_s w_{jj}(r,s,k)e_y(n-r,m-s,p)f'_j(s_j(k-)net_j(n-r,m-s,p))s_j(k) \tag{22}$$

if the jth group is not an output group

The size of the two-dimensional array of neurons that make up the group is the same size or smaller than the size of the input group array. The indices of the summation will be reflected in Equations 12, and 19-22. Thus, the network is presented with a set of P patterns, after which the weight factors are updated. The process is repeated until the network achieves the desired performance.

The above-described neural network 10 utilizing the variable gain parameter can be implemented using a mean square error (MSE) defined by:

$$MSE = \Sigma_p \Sigma_n (d_n(p) - o_n(p))^2 \tag{23}$$

where:

$o_n$ is the output of the output neuron for the pth pattern; and $d_n(p)$ is the value selected by the trainer.

In accordance with the present invention, a relative powered error (RPE) is utilized with neural network 10 and is defined by:

$$RPE(x) = (1/x)\Sigma_p \Sigma_n (A - (o_t - o_n))^x \tag{24}$$

where:

$o_t$ is the output of the neuron that corresponds to the correct classification and x is the desired power which controls the relative penalties of substitutions to reject reads; and A is the adjustable control parameter that determines when $(A-(o_t-o_n))=1$. Typically, A is set to equal 1.

RPE measures classification performance whereas MSE does not. Using the RPE, Equations 5, 7b, 8, 9, 19, and 21 are revised as follows:

$$e_j(p) = (A-(o_t-o_j))^{x-1} f'(s_j(k) net_j(p)) s_j(k) \quad (5')$$

if j is an output neuron not corresponding to the correct classification or $$e_j(p) = \sum_{\substack{n \\ n \neq j}} - (A - (o_j - o_n))^{x-1} f'(s_j(k) net_j(p)) s_j(k) \quad (5a')$$

if j is the output neuron that corresponds to the correct classification.

$$u(k) = Min((F^* RPE(x)/\Sigma_i \Sigma_j g_{ij}^2(k)), Limit) \quad (7b')$$

$$RPE(x) = \Sigma_p \Sigma_n (A - (o_t - o_n))^x \quad (8')$$

$$e_j(p) = (A - (o_t - o_j)^{x-1} s_j(k) \quad (9')$$

if j is not the neuron corresponding to the correct classification $$e_j(p) = \sum_{\substack{n \\ n \neq j}} - (A - (o_j - o_n))^{x-1} s_j(k) \quad (9a')$$

if j is the neuron corresponding to the correct neuron and n are the remaining output neurons.

$$e_j(n,m,p) = \Sigma_p(o_j(n,m,p)/(Max_{n,m} o_j(n,m,p))) (A - \quad (19')$$

$$(Max_{n,m}(o_t(n,m,p)) Max_{n,m}(o_j(n,m,p))))^{x-1} f'(net_j(n,m,p)) s_j(k)$$

if the jth output group is not associated with the correct classification, and $o_t$ is the output group that corresponds with the correct classification.

$$e_j(n,m,p) = \Sigma_p(o_j(n,m,p)/(Max_{n,m} o_j(n,m,p))) \quad (19a')$$

$$\sum_{\substack{r \\ r \neq j}} (A - (Max_{n,m}(o_j(n,m,p)) - Max_{n,m} o_r(n,m,p))))^{x-1}$$

$$f'(net_j(n,m,p)) s_j(k)$$

if the jth group corresponds to the correct classification and the rth group are output groups $$e_j(n,m,p) = \Sigma_p(o_j(n,m,p)/Max_{n,m} o_j(n,m,p)))(A-(-Max_{n,m}(o_t(n,m,p)) - Max_{n,m} o_j(n,m,p))))^{x-1} s_j(k) \quad (21')$$

if the jth output group is not associated with the correct classification, and $o_t$ is the output group that corresponds to the correct classification.

$$e_j(n,m,p) = \Sigma_p(o_j(n,m,p)/(Max_{n,m} o_j(n,m,p)) \cdot \quad (21a')$$

$$\sum_{\substack{r \\ r \neq j}} (A - (Max_{n,m}(o_j(n,m,p)) - Max_{n,m}(o_r(n,m,p))))^{x-1} s_j(k)$$

if the jth output group corresponds to the correct classification, and $o_r$ are the other output groups.

In accordance with another aspect of the present invention, the relative powered error, (RPE) can be utilized without using the gain weights, $s_j(k)$. In this embodiment of the invention, the equations for modifying the gain weights are not used. In addition, the remaining equations use the value of "1" for $s_j(k)$.

Figure 2:
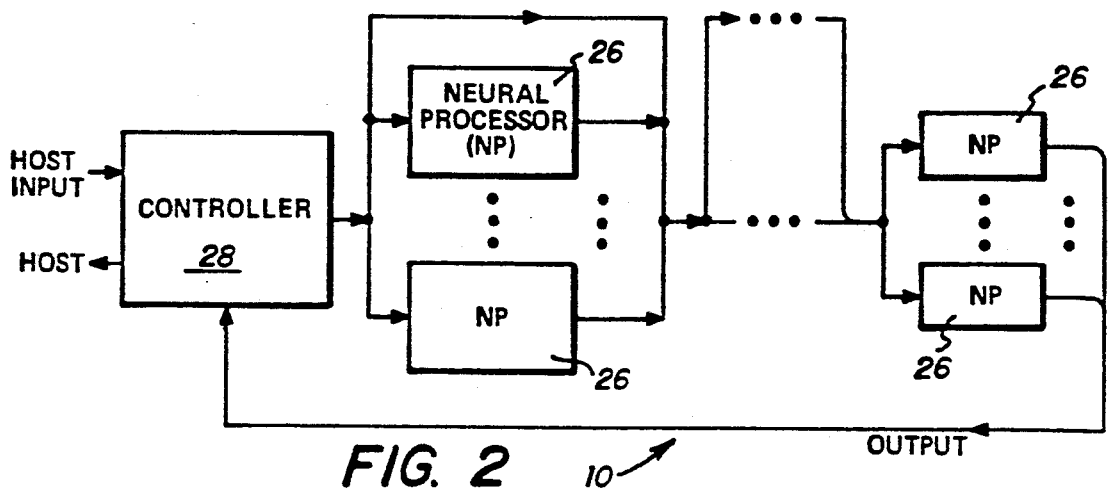
FIG. 2 a block diagram of the present neural network the modes of operation of the present invention.

The present neural network operates in three modes of operations. Mode 1 is referred to as a fixed mode, Mode 2 is a batch mode, and Mode 3 is a continuous training mode. Referring to FIG. 2, neural network 10 is illustrated as including a plurality of neural processors 26 for each of neurons 14 previously identified in FIG. 1. Neural network 10 includes a controller 28 for interfacing with a general purpose or host computer when the neural network 10 is trained off-line in the fixed mode of operation. Controller 28 controls the timing of neural processors 26, the clustering processor to be subsequently described, and timing functions with the host computer. Controller 28 implements Equation 1. The number of neural processors can vary from one, in which neural network 10 works as a virtual processor, to as many neurons as there are in the groups and layers of network 10.

Figure 3:
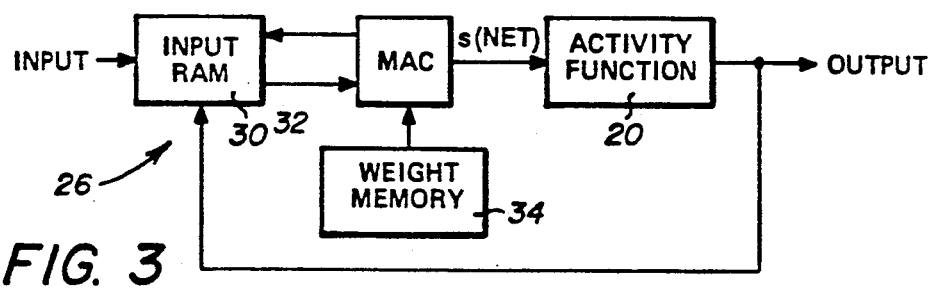
FIG. 3 is a block diagram of a neural processor for use in the fixed mode of the present neural network.

FIG. 3 illustrates a block diagram of neural processor 26 in which an input from controller 28 is applied to a random access memory (RAM) 30. The output of input RAM 30 is applied to summing network 18 (FIG. 1c) which may comprise, for example, a multiplier accumulator (MAC) 32 to utilize the weight factors 16 (FIG. 1c) from weight memory 34 and the neuron input signals together and accumulates these sums to generate the s(NET) signal applied to activity function 20. The output of activity function 20 is applied as an input to RAM 30 in the embodiment in which the neuron weights adapt. The output of activity function 20 is also applied as an input to RAM 30 of subsequent neural processors 26.

In the batch mode of operation of neural network 10, the network is trained by a training set. First, the input patterns are clustered, after the desired features, if any, are computed to produce a clustered training set. The clustered training set is presented repetitively to neural network 10 until the network is trained. Then, the clustering subsystem and the training mode are turned off and the system works similarly to the fixed mode of operation previously described.

In the continuous training mode, Mode 3 of the present invention, the neural network 10 learns with every pattern. The system evaluates the input pattern as in the fixed mode of operation and the pattern is used to update the cluster training set. Then, the cluster training set is used, with or without the current pattern, to adapt the weight factors. FIG. 2 illustrates neural network 10 for the batch and continuous modes of operation. Controller 28 implements clustering to be subsequently described as well as solving Equations 4-6 and 23.

Figure 4:
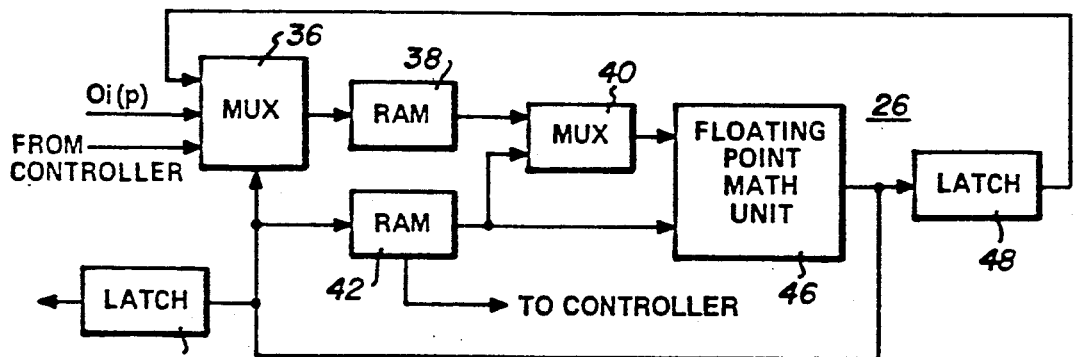
FIG. 4 is a block diagram of a neural processor for use in the batch and continuous modes of the present invention.

FIG. 4 illustrates a neural processor 26 for the batch and continuous mode of operation of the present network 10. The output of controller 28 is applied to a multiplexer 36. The output of multiplexer 36 is applied to a random access memory (RAM) 38. RAM 38 stores the input for application to a floating point math unit (FPMU) 46 via a multiplexer 40. FPMU 46 performs multiplication and accumulation operations and computes the output of the activation function 20 (FIG. 1c). The weight factors supplied by a random access memory (RAM) 42 are also applied to FPMU 46. The output of FPMU 46 is applied to an output latch 48 for the output of the jth neuron for the pth pattern and represents the output signal which is applied to subsequent neural processors 26.

Error signals from subsequent neural processors 26 are summed in FPMU 46 via multiplexer 36, RAM 38 and multiplexer 40, and the sum is stored in RAM 42. Each error signal is applied to FPMU 46 via multiplexer 40 and is multiplied by the weights stored in RAM 42. The resulting error signals are stored in a latch 50 until they are read by the appropriate neural processors 26. Subsequently, the error signal in RAM 42 is multiplied by the input signals. This multiplication is accomplished by FPMU 46. The multiplied signals are averaged into the gradient signals stored in RAM 42 and are restored in RAM 42. The controller 28 reads the gradient signals from RAM 42 of all of the neural processors 26 and supplies the convergence factor to be used to multiplexer 36. The convergence factor is applied to FPMU 46, RAM 38 and multiplexer 40. FPMU 46 multiplies the convergence factor by the gradient signals stored in RAM 42 and provides an output to multiplexer 36. The resulting correction signals are added by FPMU 46 to the weights stored in RAM 42 and the resulting weight is then restored in RAM 42.

The output signals of the training set found in accordance with the cluster techniques of the present invention to be subsequently described are computed. The errors are then computed back throughout neural network 10 and the gradients for each group of neurons is computed. The average of the gradient for all patterns is computed and the weight change for each neuron is made. The weight changes for each of the patterns is averaged such that neural network 10 is capable of learning the patterns much quicker by condensing the error history of the neurons within neural processor 10.

Another aspect of the present neural network 10 is the use of a clustering technique. The clustering technique of the present invention reduces the training set to a representative sample that neural network 10 actually trains upon. The distance between the pattern and the mean of each cluster is calculated. If the distance is less than a user-defined threshold, then the pattern is included within the cluster with the smallest distance and the mean of the cluster is updated within the pattern. If the distance is not less than the user-defined threshold for all clusters, a new cluster is created and the mean of the new cluster is equal to the mean of the pattern. These steps are repeated for each of the patterns in the training set. The means found by the cluster and algorithm are used as the training input to the neural network. The distance may be defined as:

$$D_j = \Sigma_y (m_{jy} - t_y)^2; \text{ or} \quad (23)$$

$$D_j = 1 - M^T T / (\|M\| * \|T\|) \quad (24)$$

where:
$m_{jy}$ is the yth element of the mean vector of the jth cluster;
$t_y$ is the yth element of the pattern to be clustered;
$M^T$ is the transpose of the mean vector;
$\|M\|$ is the norm of the mean vector;
T is the pattern vector;
$\|T\|$ is the norm of the pattern vector; and
$D_j$ is the distance between the pattern and the jth cluster.

Figure 5:
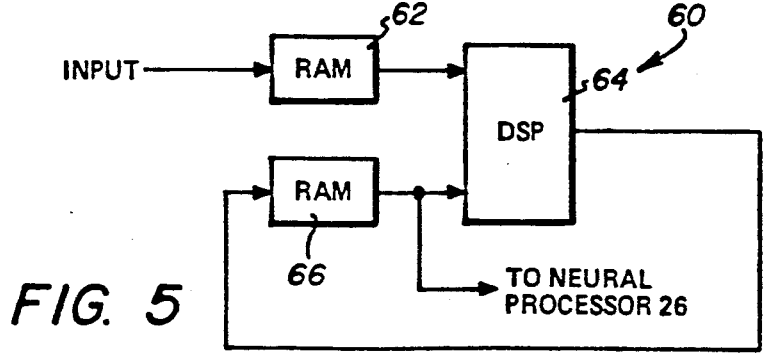
FIG. 5 is a block diagram of a clustering processor for use with the present system.

Referring now to FIG. 5, controller 28 is used to perform the clustering technique of the present invention and includes a clustering processor 60 which executes Equations 23 or 24. Clustering processor 60 includes a random access memory (RAM) 62 which receives and temporarily stores the input pattern. The distance between the input pattern and mean pattern of found clusters are computed by a DSP chip 64, which may comprise, for example, a model DSP 56000 manufactured and sold by Motorola, Incorporated. DSP chip 64 computes the mean pattern that is closest to the input pattern and compares that distance to a threshold. If the distance computed is less than the threshold, the input is averaged into the corresponding mean vector. If not, the input pattern is stored in a random access memory (RAM) 66. The mean vectors are supplied to neural processors 26 from RAM 66.

It therefore can be seen that the present neural network functions to learn arbitrary associations and to recognize patterns significantly faster than previously developed neural networks. In the training mode of the present neural network, mean patterns from clustered inputs are utilized to train on a representative sample of the input patterns in order to increase the speed of the learning process. This utilization of the generalization capability of the neural network allows the overall system to learn faster than previously developed systems.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A neural-simulating system for processing input stimuli, comprising:
   a plurality of layers, each layer receiving layer input signals and generating layer output signals, said layer input signals including signals from the input stimuli and ones of said layer output signals from only previous layers within said plurality of layers;
   each of said plurality of layers including a plurality of neurons operating in parallel on said layer input signals applied to said plurality of layers; and
   each of said neurons deriving neuron output signals from a continuously differentiable transfer function for each of said neurons based upon a product of a gain weight associated with each of said neurons and a combination of sets of weights associated with said neurons and said layer input signals.

2. The neural-simulating system of claim 1 and further including:
   said plurality of neurons within a layer being arranged in groups of neurons operating in parallel on said layer input signals;
   weight constraining means associated with each of said groups of neurons for causing each of said groups of neurons to extract a different feature from said layer input signals and for further causing each neuron within a group of neurons to operate on a different portion of said layer input signals; and
   gain weight constraining means associated with each of said groups of neurons for causing each of said groups of neurons to extract a different feature from said layer input signals and for further causing each neuron within a group of neurons to operate on a different portion of said layer input signals.

3. The neural-simulating system of claim 2 and further including:

adaptive network means associated with each neuron for generating weight correction signals based upon gradient estimate signals and convergence factors signals of each neuron and for processing said weight correction signals to thereby modify said weights associated with each neuron;

weight correction signal constraining means associated with each neuron within said groups of neurons for causing each neuron within a group of said neurons to extract the same feature from said layer input signals and for further causing each neuron within a group of neurons to operate on a different portion of said layer input signals;

adaptive network means associated with each neuron for generating a gain weight correction signal based upon said gradient estimate signals and said convergence factors signals of each neuron and for processing said gain weight correction signals to thereby modify said gain weights associated with each neuron; and gain weight correction signal constraining means associated with each neuron within said groups of neurons for causing each neuron within a group of said neurons to extract the same feature from said layer input signals and for further causing each neuron within a group of neurons to operate on a different portion of said layer input signals.

4. The neural-simulating system of claim 1 and further including:

adaptive network means associated with each neuron for generating weight correction signals based upon said gradient estimate signals and said convergence factors signals of each neuron and for processing said weight correction signals to thereby modify said weights associated with each neuron; and adaptive network means associated with each neuron for generating a gain weight correction signal based upon said gradient estimate signals and said convergence factors signals of each neuron and for processing said gain weight correction signals to thereby modify said gain weights associated with each neuron.

5. A neural-simulating system which is trained on a set of input patterns to the system for subsequent identification of unknown patterns, comprising:

clustering means for extracting a training set of patterns representing samples of the input patterns and for updating the training set from the input patterns to the system;

a plurality of layers, each layer receiving layer input signals and generating layer output signals, said layer input signals including signals from the training set and ones of said layer output signals from only previous layers within said plurality of layers;

each of said plurality of layers including a plurality of neurons operating in parallel on said layer input signals applied to said plurality of layers;

each of said neurons deriving neuron output signals from a continuously differentiable transfer function for each of said neurons based upon a product of a gain weight associated with each of said neurons and a combination of sets of weights associated with said neurons and said layer input signals; and adaptive network means associated with each neuron for generating gain weight correction signals based upon gradient estimate signals and convergence factors signals of each neuron and for processing said gain weight correction signals to thereby modify said gain weights associated with each neuron.

6. The neural-simulating system of claim 5 and further including:

said plurality of neurons within a layer being arranged in groups of neurons operating in parallel on said layer input signals;

weight constraining means associated with each of said groups of neurons for causing each of said groups of neurons to extract a different feature from said layer input signals and for further causing each neuron within a group of neurons to operate on a different portion of said layer input signals; and weight correction signal constraining means associated with each neuron within said groups of neurons for causing each neuron within a group of said neurons to extract the same feature from said layer input signals and for further causing each neuron within a group of neurons to operate on a different portion of said layer input signals.

7. The neural-simulating system of claim 5 and further including;

means for generating neuron output signals from a continuously differentiable transfer function for each of said neurons based upon a product of a gain weight associated with each of said neurons and a combination of sets of weights associated with said neurons and said layer input signals; and adaptive network means associated with each neuron for generating gain weight correction signals based upon gradient estimate signals and convergence factors signals of each neuron and for processing said gain weight correction signals to thereby modify said gain weights associated with each neuron.

* * * * *

UNITED STATES PATENT AND TRADEMARK OFFICE
CERTIFICATE OF CORRECTION

PATENT NO. : 5,075,871
DATED : DECEMBER 24, 1991
INVENTOR(S) : WILLIAM E. WEIDEMAN

It is certified that error appears in the above-identified patent and that said Letters Patent is hereby corrected as shown below:

ON THE TITLE PAGE OF THE PATENT, IN THE PATENT HEADING, DELETE "WEIDMAN" AND SUBSTITUTE THEREFOR -- WEIDEMAN --.

item [75] DELETE "WEIDMAN" AND SUBSTITUTE THEREFOR -- WEIDEMAN --.

Signed and Sealed this

Twenty-fifth Day of May, 1993

Attest:

MICHAEL K. KIRK

*Attesting Officer*     Acting Commissioner of Patents and Trademarks